United States Patent [19]

Kuwano

[11] 4,005,483

[45] Jan. 25, 1977

[54] AUTOMATIC RECORD CONTROL APPARATUS WITH MULTICHANNEL MEMORY

[75] Inventor: Takeshi Kuwano, Mito, Japan
[73] Assignee: Hitachi, Ltd., Japan
[22] Filed: Nov. 15, 1974
[21] Appl. No.: 524,273

[30] Foreign Application Priority Data

Nov. 19, 1973 Japan .............................. 48-129963

[52] U.S. Cl. .................................. 360/69; 360/35; 360/63; 360/33; 346/107 B
[51] Int. Cl.² ..................... G11B 15/14; H04N 5/78
[58] Field of Search .................. 360/10, 35, 63, 60, 360/78, 74, 69, 33; 178/DIG. 1; 346/107 B

[56] References Cited

UNITED STATES PATENTS

| | | | |
|---|---|---|---|
| 2,943,141 | 6/1960 | Knight | 360/10 |
| 3,440,347 | 4/1969 | Spencer | 179/1 VC |
| 3,518,366 | 6/1970 | Phan | 360/10 |
| 3,577,153 | 5/1971 | Yagi | 178/DIG. 1 |
| 3,678,189 | 7/1972 | Oswald | 178/DIG. 1 |
| 3,829,869 | 8/1974 | Balko | 346/107 B |
| 3,911,484 | 10/1975 | Muton | 360/63 |

*Primary Examiner*—Bernard Konick
*Assistant Examiner*—Alan Faber
*Attorney, Agent, or Firm*—Craig & Antonelli

[57] ABSTRACT

An automatic record control apparatus is disclosed in which multichannel tracks of a rotary magnetic recording medium are endlessly traced one track-by-one track in response to pulses associated with vertical synchronizing pulses of a video signal. With the closing of a recording switch, the video signal is recorded in the tracks being traced, and the number of the recording tracks to be recorded are limited to a predetermined number from the instant of detection of a signal associated with a motion of an object to be recorded by counting the number of the signal, the recording operation being automatically stopped after coverage of predetermined number of tracks.

7 Claims, 6 Drawing Figures

AUTOMATIC RECORD CONTROL APPARATUS WITH MULTICHANNEL MEMORY

BACKGROUND OF THE INVENTION

1. FIELD OF THE INVENTION

This invention relates to an automatic record control apparatus for the multichannel memory for recording a video signal in or reproducing it from multichannel tracks of a rotary magnetic recording medium.

2. DESCRIPTION OF THE PRIOR ART

There is a conventional multichannel memory in which multichannel tracks of a rotary magnetic recording medium are switched by means of pulses associated with vertical synchronizing pulses of a video signal while tracing each of the tracks endlessly, so that the video signal is recorded in the track traced by closing a recording switch. In this multichannel memory, the recording switch is opened manually when it is desired to stop the recording operation. Therefore, when a desired video signal is being recorded in the tracks, the recording operation must be manually stopped before recording another video signal in the formerly recorded tracks. Otherwise, at least part of the previously recorded desired video signal is erased undesirably. Since the person who has closed the switch cannot begin his action immediately the track in which the instant of the very beginning of his action is recorded varies case by case. In this case, the person cannot use effectively a limited number of multichannel tracks. Also, it is impossible to record an instantaneous variation of a motion. Unless the recording operation is automatically stopped upon completion of recording in all the limited number of multichannel tracks, at least part of the video signals previously recorded is undesirably erased, thus making it impossible to make the best of the multichannel tracks. When one desires to record his action of swinging a golf club which lasts for about one second, for instance, the club swinging action is recorded in 1/15 second segments in each of a limited number of tracks, say, 15 tracks. In such a case, after completeing the swinging action, it takes at least one second before opening the recording switch, and therefore it is impossible to reproduce the recorded action thoroughly.

SUMMARY OF THE INVENTION

Accordingly, it is an object of the invention to provide an automatic record control apparatus for multichannel memory which is capable of automatically stopping the recording operation.

Another object of the invention is to provide a commercial version of the automatic record control apparatus of this type.

DESCRIPTION OF THE PREFERRED EMBODIMENTS

Figure 1:
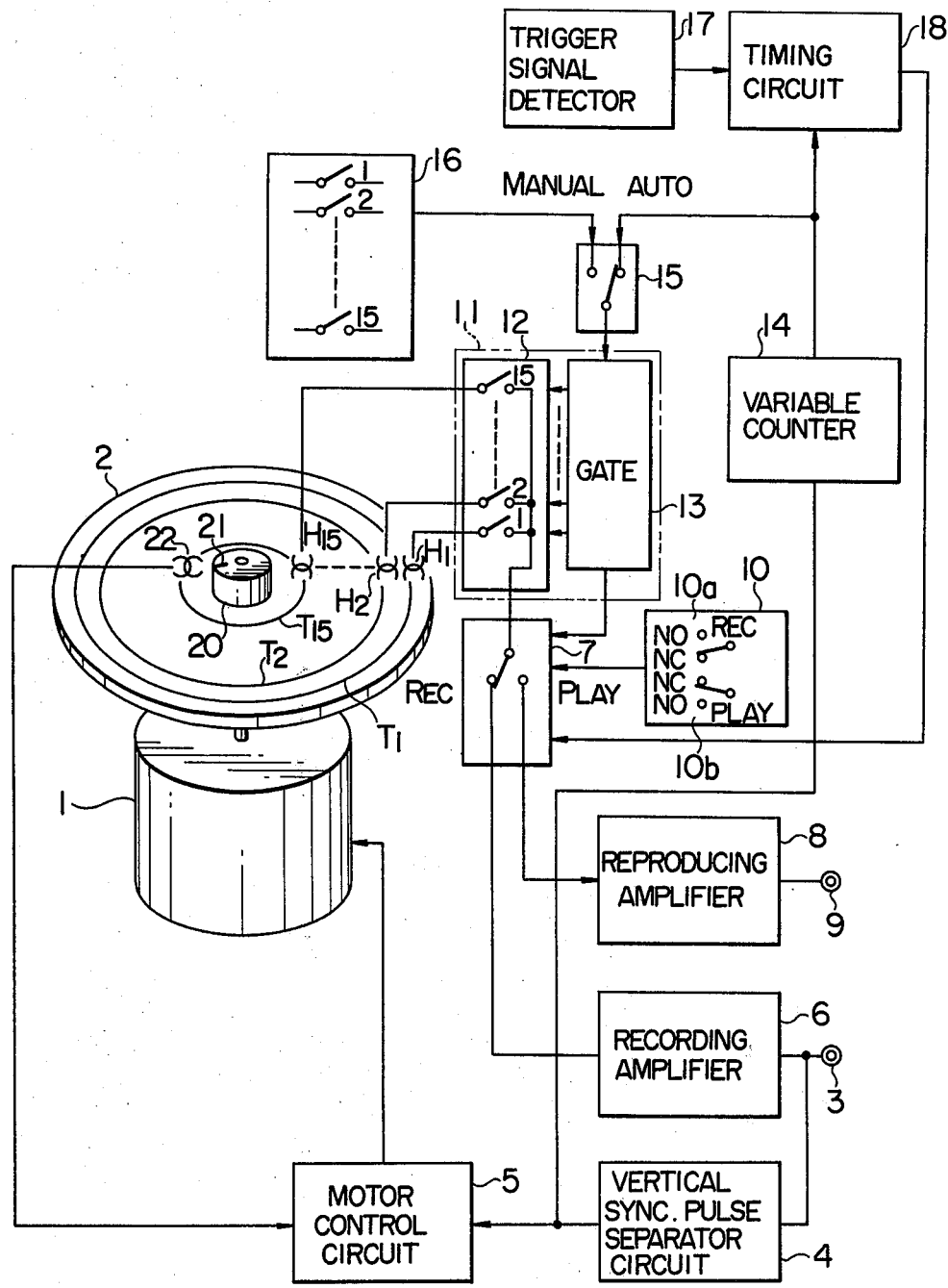
FIG. 1 is a schematic diagram showing the automatic record control apparatus for multichannel memory according to an embodiment of the present invention.

Referring to FIG. 1, a rotary disc 2 is fixed on the motor shaft of a synchronous motor 1, and a plurality of multichannel heads $H_1, H_2, \ldots H_{15}$ are arranged opposite the multichannel tracks $T_1, T_2, \ldots T_{15}$ of the rotary disc 2, respectively. Out of the video signal inputs to the video signal input terminal 3, only vertical synchronizing pulses are picked up by the vertical synchronizing pulse separator circuit 4 and applied to the motor control circuit 5, the output of which is used to drive the synchronous motor 1 to thereby rotate the rotary disc 2. A magnet 21 recessed into a groove of a cylindrical member 20 fixed on the top of the shaft of the motor 1 passes a position detecting head 22 opposite thereto, at every rotation, thereby causing rotational pulses to be produced at the head 22. These pulses are applied to the motor control circuit 5 and are used to control the frequency for driving the motor 1. Under normal condition, the rotary disc 2 rotates in synchronism to the 60 Hertz frequency of the vertical synchronizing pulses.

On the other hand, the video signal applied to the video signal input terminal 3 is also applied to an input terminal on the recording side of a recordreproduction change-over circuit 7 through a recording amplifier circuit 6, the reproduction side terminal of the circuit 7 being connected through a reproducing amplifier circuit 8 to an output terminal 9. The circuit 7 is controlled by a change-over switch 10 comprising a record switch 10a and a reproduction switch 10b and has a common or movable terminal connected to a head change-over switch 12. The head change-over switch 12 has a plurality of electrical switches adapted to be connected to corresponding multichannel heads $H_1, H_2, \ldots H_{15}$ respectively. Under normal operating conditions, when these switches are open, the recording amplifier 6 or the reproducing amplifier 8, as the case may be, is electrically disconnected from the multichannel heads $H_1, H_2, \ldots H_{15}$. This head change-over circuit 12, together with a gate circuit 13, make up a trace circuit 11. The vertical synchronizing pulses taken out at the vertical synchronizing pulse separator circuit 4 are applied to the gate circuit 13 through a variable counter 14 and an auto-manual changeover switch 15. The vertical synchronizing pulses applied to the variable counter circuit 14 at regular intervals of 1/60 seconds are converted by the circuit 14 into pulses with intervals of 1/60, 1/30, 1/15 second and the like, which are hereinafter referred to as the pulses associated with the vertical synchronizing pulses as they are based on the original vertical synchronizing pulses.

When the auto-manual change-over switch 15 is closed on the auto side, the pulses associated with the vertical synchronizing pulses are applied to the gate circuit 13 to energize the electrical switches of the head change-over switch circuit 12 in succession from the first channel in such a manner that a switch for a channel is energized while at the same time cutting OFF the immediately previous channel. Thus the electrical connection between the recording amplifier 6 or reproducing amplifier 8 and the multichannel heads is switched continuously, with the result that the first channel is energized simultaneously with the cutting OFF of the 15th channel. In other words, the trace circuit 11 comprising the gate circuit 13 and the head change-over circuit 12 traces sequentially the multichannel tracks $T_1, T_2, \ldots T_{15}$ corresponding to the multichannel heads $H_1, H_2, \ldots H_{15}$ respectively to begin to trace again from the track $T_1$ after the track $T_{15}$ has been traced.

As long as the recording switch 10a of the change-over switch 10 is thrown on the normally open side, the electrical switch of the record-reproduction change-over switch circuit 7 is maintained on the record side. Under the condition, the video signal processed through the recording amplifier is applied through the record-reproduction change-over circuit 7 to the tracing circuit 11 and recorded in tracks one by one being traced.

Such a recording operation is automatically stopped by a trigger signal detector 17 and a timing circuit 18. The trigger signal detector 17 is provided for detecting a trigger signal generated in association with a motion to be recorded, and comprises, for example, a microphone for detecting an impact sound of a golf club which is swung. The trigger signal detector by the trigger signal detector 17 is applied to the timing circuit 18, which begin to count the pulses associated with the vertical synchronizing pulses applied from the variable counter 14 when the trigger signal is applied thereto. When the number of the pulses counted by the timing circuit 18 reaches a predetermined specific number, e.g. 8, the record-reproduction change-over circuit 7 is controlled in such a manner that the electrical switch thereof is switched from recording to reproducing side thereby to stop the recording operation. The pulses associated with the vertical synchronizing pulses are used to switch a track to the next track where the video signal is recorded next. Therefore, the fact that the recording operation is stopped after the timing circuit 18 counts 8 pulses associated with the vertical synchronizing pulses is equivalent to the fact that the recording operation has been stopped after sequential recording of 7 tracks following the detection in the trigger signal detector 17. Therefore, in the case where the number of multichannel tracks $T_1, T_2, \ldots T_{15}$ are 15, for example, video signals are recorded in 8 tracks before the detection by the trigger signal detector 17 of a trigger signal generated in association with a motion to be recorded, while they are recorded in 7 tracks after the detection. In this way, a timely recording of the motion immediately before and after the pulses generated by the trigger signal detector 17 is assured. In the recording state where tracks are changed in response to pulses arriving at intervals of 1/15 second, for example, the swinging of a golf club against a golf ball results in the part of swing before impact on the golf ball being continuously recorded in 8 tracks, and in part of swing after the very instant of impact being continuously recorded in 7 tracks, until the recording operation is stopped. As a result, such a motion as swing of a golf club in which there are instantaneous changes in action is recorded both effectively and accurately in a limited number of tracks.

By the way, a manual switch group 16 including switches $1, 2, \ldots 15$ corresponding to the multichannel heads $H_1, H_2, \ldots H_{15}$ and connected with the manual side terminal of the auto-manual change-over switch 12, is provided for switching the reproducing switch 10b of change-over switch 10 to the normally open side, and for changing the position of the record-reproduction change-over switch 7 to the play side, in addition to changing the auto-manual change-over switch 15 to the manual side, to thus provide the capability for reproducing a recorded video signal from any given track of the multichannel tracks $T_1, T_2, \ldots T_{15}$.

Figure 2A:
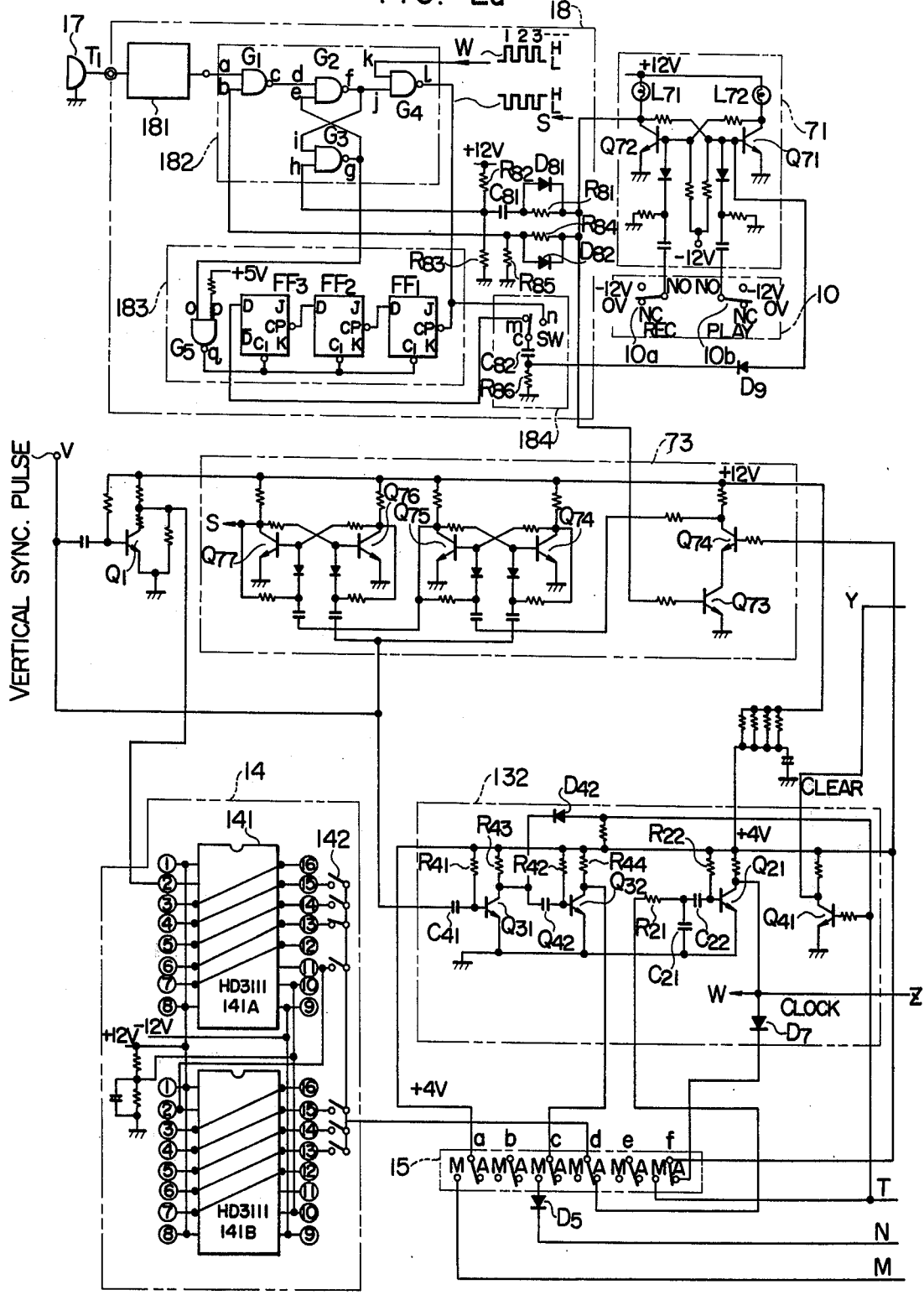
FIG. 2, consisting of 2A and 2B, is a circuit diagram showing an embodiment of the essential parts of the apparatus shown in FIG. 1.
Figure 2B:
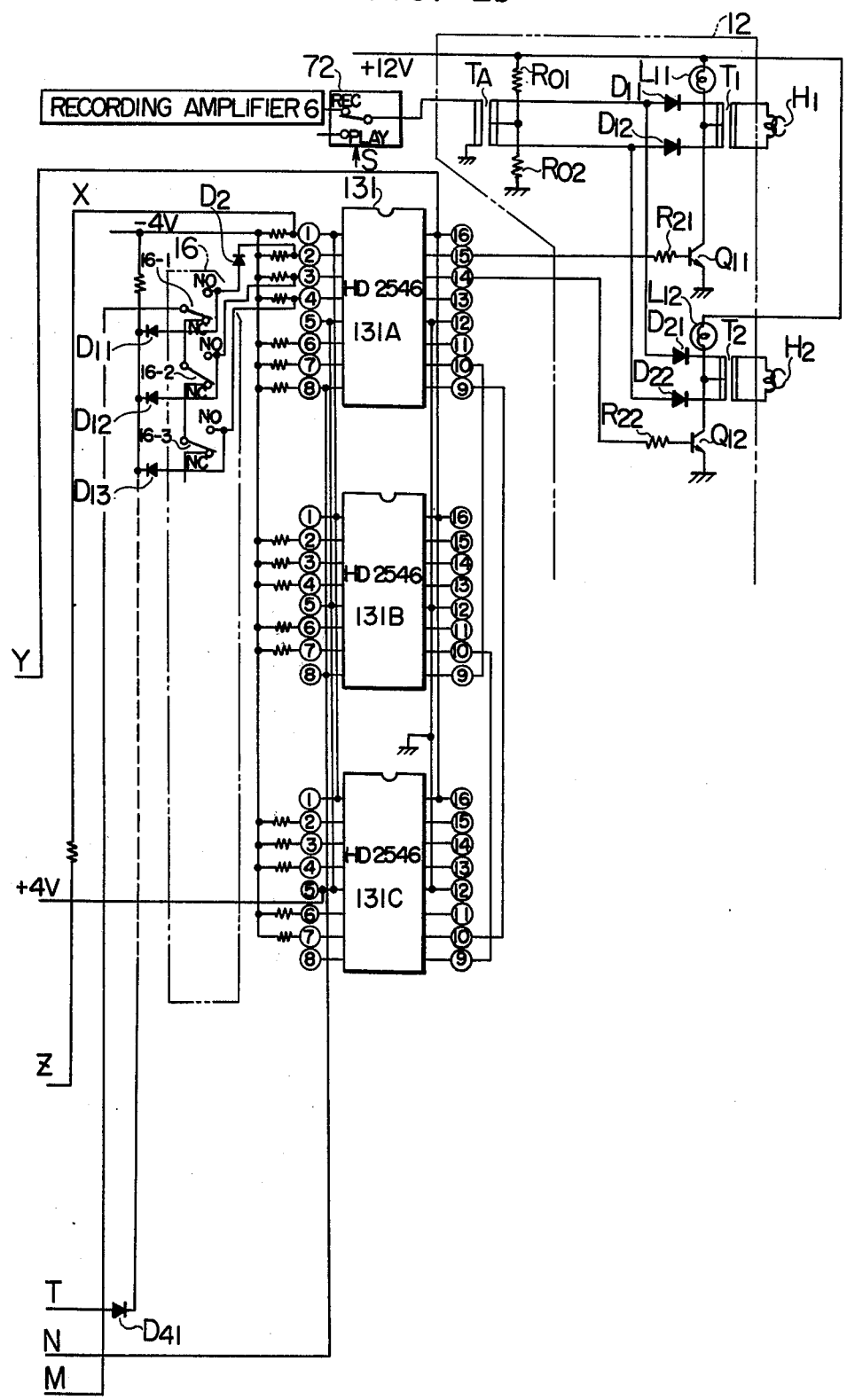

An embodiment will be described with reference to the circuit diagram of FIG. 2.

The head change-over circuit 12 comprises diodes $D_{11}$ and $D_{12}$, a pulse transformer $T_1$ and a transistor $Q_{11}$ as an electrical transmission path for head $H_1$, and diodes $D_{21}$ and $D_{22}$, a pulse transformer $T_1$ and a transistor $Q_{12}$ as an electrical transmission path for head $H_2$. Similar arrangements are included but not shown as electrical transmission paths for remaining heads $H_3$ to $H_{15}$, the pulse transformer $T_4$ being common to all of the abovedescribed transmission paths. The anodes of the diodes $D_{11}$ and $D_{12}$ impressed with a voltage divided at the resistors $R_{01}$ and $R_{02}$, and the cathodes of the diodes $D_{11}$ and $D_{12}$ are connected to the transistor $Q_{11}$. As long as there is no gate input applied to the transistor $Q_{11}$, the diodes $D_{11}$ and $D_{12}$ are kept OFF and therefore the electrical transmission paths for video signals are also in the OFF state. When a gate input is applied to any of the transistors $Q_{11}$, $Q_{12}$ and so on, the diode connected with that particular transistor is turned ON and a corresponding electrical transmission path also turned ON.

The electrical transmission path of the head change-over circuit 12 is controlled by the gate circuit 13 comprising a drive circuit 131 and a waveform processing circuit 132. The drive circuit 131 includes three shift registers 131A to 131C made of, for example, integrated circuits HD2546 of Hitachi, Ltd. Each of the shift registers 131A to 131C is a 5-bit shift register having eight terminals respectively on its input and output sides for a total of 16 terminals, of which the terminals 15, 14, 13, 11 and 10 are output terminals. Upon the application of a clock pulse to the clock pulse terminal 1, an output of logic 1 is produced at the output terminal 15. The application of the next clock pulse causes an output of logic 1 to be produced only at the output terminal 14. In like manner, an output of logic 1 is produced at the output terminals 13, 11 and 10 in that order. Since the output terminal 10 is connected to the serial IN terminal 9 of the circuit element 141B, the arrival of the next clock pulse causes outputs to be sequentially produced at the output terminals of the register 131B following the register 131A. Similarly, outputs of logic 1 are produced in sequence at the output terminals 15, 14, 13, 11 and 10 of the next registrer 131C. In view of the fact that the output terminal 10 of the register 131C is connected to the serial IN terminal 9 of the first register 131A, the arrival of the next clock pulse, if any, causes output pulses of logic 1 to be continuously produced in sequence at the output terminals of the register 131A. In this way, when the first clock pulse arrives, an output of logic 1 is produced at the output terminal 15 and energizes the transistor $Q_1$ as a gate input thereto, whereupon the diodes $D_{11}$ and $D_{12}$ are turned ON thereby to establish the electrical transmission path for head $H_1$. The next arriving clock pulse causes only the electrical transmission path for heaD $H_2$ to be operatively energized. In this manner, each time of arrival of clock pulses, the electrical transmission paths for heads $H_1, H_2, \ldots H_{15}$ are established in sequence, and after that, transfer is made from head $H_{15}$ to $H_1$ for subsequent sequential energization. The result is that the tracing circuit 11 comprising the gate circuit 13 and the head change-over circuit 12 endlessly traces in sequence the multichannel tracks $T_1, T_2, \ldots T_{15}$ opposedly placed to the multichannel heads $H_1, H_2, \ldots H_{15}$.

A detailed description of the clock pulses will now be made. The clock pulses are based on vertical synchronizing pulses of the video signal which are positive pulses having a repetition frequency of 1/60 second. These pulses are applied to the terminal V shown to the extreme left of FIG. 2a, and after being converted into negative pulses in the transistor $Q_1$, applied to the variable counter circuit 14 including a frequency divider circuit divider 141 and a selection switch 142. The frequency divider circuit 141 includes frequency dividers 141A and 141B made of couple of integrated circuits HD-311 of Hitachi, Ltd. The negative pulses are divided into different pulse frequencies including 1/60, 1/30, 1/15, 1/10 and the like in the frequency divider circuit 141 and are produced at the output terminals 15, 14, 13, 11, and so on of the frequency divider 141A. One of such pulses is selected by the selection switch 142. Therefore, the signal taken out of the selection switch 142 is a pulses signal associated with the vertical synchronizing pulses. These pulses are negative ones and, while the auto-manual change-over switch 15 is closed on the auto side (A), are applied through the switch 15d, through an integrating circuit comprising a capacitor $C_{21}$ and a resistor $R_{21}$ of a waveform shaping circuit 132, to a transistor $Q_{21}$. Since the transistor $Q_{21}$ is ON as a voltage is applied to the base thereof through the resistor $R_{22}$, the transistor $Q_{21}$ is turned OFF and a positive pulse produced at its collector upon application of a negative portion of the integrated waveform. The pulse thus obtained is the clock pulse.

Next a description will be made in more detail of the recording operation. The recording operation is initiated by changing-over th recording switch 10a of the change-over switch 10 from the normally closed side (NC) side to the normally open (NO) side. When the recording switch 10a is switched to the NO side, a hold circuit 71 that is part of the record-reproduction changeover switch 7 is controlled. The hold circuit 71 is a bistable multivibrator including a transistor $Q_{72}$, the collector voltage of which reaches an H level when the recording switch 10a is switched to NO side. The H level here means a high voltage than the threshold voltage level. At the same time, the transistor $Q_{71}$ is energized thereby a turn on a record indication lamp $L_{72}$. When the collector voltage of the transistor $Q_{72}$ reaches the H level, the electrical switch 72 to the left of the head change-over switch circuit 12 is changed over to the recording side, whereupon the recording amplifier 6 and the head change-over circuit 12 are connected electrically with each other, with the result that video signals are recorded in succession in the multichannel tracks $T_1, T_2, \ldots T_{15}$ of the magnetic recording medium 2 of FIG. 1 through the multichannel heads $H_1, H_2, \ldots H_{15}$.

If a golf club is swung under this condition, the sound produced by the impact of the club on the gold ball is detected by the microphone 17 representatve of the trigger signal detector 17 and applied to the timing circuit 18 as a trigger signal. The timing circuit 18 comprises a low frequency amplifier 181, a gate circuit 182, a counter circuit 183 and a control circuit 184. The impact sound detected by the trigger signal detector 17 is amplified by the low frequency amplifier 181 into a fixed H level and applied to an input terminal $a$ of the NAND gate $G_1$ of the gate circuit 182. The outer input terminal $b$ of the NAND gate $G_1$ is connected through a resistor $R_{84}$ to the collector of the transistor $Q_{72}$, which is maintained at the H level as the recording switch 10a is on NO side. Both the input terminals $a$ and $b$ of the NAND gate G are at the H level when the impact sound is detected by the trigger signal detector 17, and therefore the output terminal C thereof is at an L level, that is, a voltage level lower than the threshold voltage. The voltage of this L level is applied to an input terminal $d$ of the next NAND gate $G_2$ which, together with the NAND gate $G_3$, makes up an RS flip-flop. The output terminal $f$ of the NAND gate $G_2$ is reversed into the H level and kept at that level until voltage of L level is applied to an input terminal $h$ of the NAND gate $G_3$. An H-level signal produced from the NAND gate $G_2$ is applied to an input terminal $j$ of the next NAND gate $G_4$. Also, the clock pulse associated with the vertical synchronizing pulse which is produced at the collector of the transistor $Q_{21}$ of the waveform shaping circuit 132, is applied to another input terminal $k$ of the NAND gate $G_4$. Therefore, when the H-level signal applied to the input terminal $j$ of the NAND $G_4$ is ON gate $G_4$ delivers an inverted pulse at the output terminal $l$ feed the next counter circuit 183. The counter circuit 183 comprises three JK flip-flops $FF_1$, $FF_2$ and $FF_3$ and a NAND gate $G_5$. Each of the pulses, which is applied to the circuit 183 from the gate $G_4$ with the intervals of, e.g. 1/15 second, is counted by the three flip-flops $FF_1, FF_2$ and $FF_3$. With the arrival of the first pulse, the output terminals of the three flip-flop becomes H-level, L-level and L-level respectively; With the arrival of the second pulse, they become L, H and L; With the arrival of the third pulse, they become H, H and L; With the arrival of the fourth pulse, they become L, L and H. As will be seen, the output terminal D of the flip-flop $FF_3$ becomes H-level for the first time with the arrival of the fourth pulse. The output terminal D is connected to the $m$ side of the switch SW of the control circuit 184, and the common terminal C of the switch is grounded through a capacitor $C_{82}$ and a resistor $R_{86}$ both of which is connected in series. Therefore, when the switch SW is closed on the $m$ side, the capacitor $C_{82}$ is charged at H level. Further, with the arrival of the fifth pulse, the output terminals of the flip-flops $FF_1$, $FF_2$ and $FF_3$ become H, L and H respectively; With the arrival of the sixth pulse, they become L, H and H; With the arrival of the seventh pulse, they become H, H and H; With the arrival of the eighth pulse, they become L, L and L. Namely, the output terminal D of the flip-flop $FF_3$ changes from H to L level with the arrival of the eighth pulse, and the capacitor $C_{82}$ discharges through the circuit consisting of flip-flop $FF_3$, ground and the resistor $R_{86}$, so that a negative pulse is generated through the resistor $R_{86}$. This negative pulse is applied to the base of the transisitor $Q_{71}$ through the diode $D_9$, whereupon the collector voltage of the transistor $Q_{72}$ is changed to L level, with the result that the electrical switch 72 is changed over from the record to play side thereby stopping the recording operation. At the same time, a negative voltage is produced across the resistor $R_{83}$ and applied to the input terminal h of the NAND gate $G_3$ as the L-level voltage, thus closing the NAND gate $G_4$. The clock pulses are thereby prevented from being applied to the counter circuit 183. With the application of the L-level pulse to the input terminal $h$ of the NAND gate $G_3$, an H-level signal is produced at its output terminal $g$ and is applied to the input terminal $o$ of the NAND gate $G_5$. Since an H-level pulse is always applied to the input terminal $p$ of the NAND gate $G_5$, the output terminal $g$ thereof is at an L level, which clears the flip-flops $FF_1$, $FF_2$ and $FF_3$. Also, when the collector voltage of the transistor $Q_{72}$ reaches an L level, it is applied through the diode $D_{82}$ to the input terminal $b$ of the NAND gate $G_1$ and the NAND gate $G_1$ is closed, thus preventing the NAND gate $G_1$ from being opened even if an video signal is applied to the input terminal $a$.

The above-mentioned fact that the recording operation is stopped with the arrival of eight pulses associated with the vertical synchronizing signal indicated that, subsequent to the detection of the impact sound, the recording operation is stopped immediately before a video signal is recorded in the eighth track after the track-by-track sequential recording of the video signal in the seven multichannel tracks. In this way, the intended swinging action of the golf club is recorded continually but without any interruptions in a total of 15 tracks including the eight tracks before the detection of impact sound and the seven tracks following the detection thereof. Even though the number of tracks is limited to 15 in the present case, the fact that the instant of impact on the golf ball falls substantially on the center tracks of the multichannel tracks makes possible accurate and effective utilization of the limited number of tracks. Further, since the recording operation stops automatically when seven tracks was recorded after detection of the impact sound, all of the 15 tracks are utilized to the fullest extent by a person switching the recording switch to NO side in recording his swing. Furthermore the very quick action of the golf club swing which lasts only about a second can be successfully recorded without any risk of it being erased.

In the event that the reproduction of the recorded video signal representative of the golf club swing is required, the reproducing switch 10b of the change-over switch 10 may be thrown to NO side. Under this condition, if the auto-manual change-over switch 15 is an AUTO (A) side, the golf club swing is reproduced continuously. If the reproduction of a specific instant of the swing action is required, on the other hand, a corresponding switch of the manual switch group 16 may be switched to NO side while keeping the auto-manual change-over switch 15 on MANUAL (M) side. When the switch 16-1 is closed to NO side, for instance, a voltage of +4V is applied to the anode of the diode $D_2$ through the switch 15a, so that the diode $D_2$ is energized thereby to apply an H level voltage to the channel input terminal 2. First, a clear pulse is applied to the clear pulse input terminal 16 of IC161A thereby to clear all the channel output terminals 15, 14, 13 11 and 10 irrespective of whether any of them is at H level or not. Next, as H-level preset pulse is applied to the preset terminal 8 thereby to render an output terminal 15, an H level in voltage. Thus, the diodes $D_{11}$ and $D_{12}$ are energized, so that a video signal is picked up and reproduced through head $H_1$.

A description will be made here of the clear pulses. The voltage of +4V applied to the switch 16-1 is applied further to the cathode of the diode $D_{41}$ through the diode $D_{11}$. The anode of the diode $D_{41}$ is connected to the anode of the diode $D_{42}$, the cathode potential of which is compared with the anode potential of the diode $D_{41}$. The diode $D_{42}$ is connected to the collector of the transistor $Q_{31}$. The vertical synchronizing pulse, or a negative pulse in the case under consideration, applied to the transistor $Q_{31}$ differentiated by a differentiation circuit consisting of a capacitor $C_{41}$ and a resistor $R_{41}$. The transistor $Q_{31}$ which is ON with a voltage applied to the base thereof through the resistor $R_{41}$ is turned OFF by the negative portion of the differentiated waveform, thus increasing its collector potential. In other words, a positive pulse in synchronism with the negative portion of the waveform is picked up, so that the voltage of +4V is applied to the cathode of diode $D_{42}$ only in the presence of the positive pulse. As a result, the voltage at the cathode of the diode $D_{42}$ becomes substantially equal to the voltage at the cathode of diode $D_{41}$ is potential, and only under this condition, transistor $Q_4$ (connected to the anoes of diodes $D_{41}$ and $D_{42}$) is energized, with the result that the collector potential of the transistor is reduced to an L level. This is the clear pulse.

An explanation will now be made of the preset pulse. The output pulse of the transistor $Q_{31}$ is differentiated by the differentiating circuit comprising the capacitor $C_{42}$ and the resistor $R_{42}$. A pulse in synchronism with the negative potion of the differentiated waveform is picked up at the next transistor $Q_{32}$ as in the case of the transistor $Q_{31}$, and the resulting pulse is applied as a preset pulse to the present input terminal 8 of each of the integrated circuits through the switch 12c and diode $D_5$.

Figure 3:
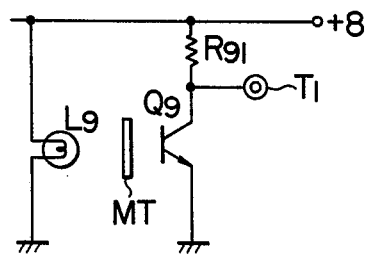
FIG. 3 is a circuit diagram showing another embodiment of an action or motion detector.
Figure 4A:
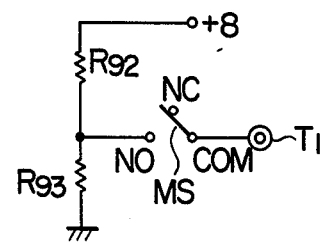
FIG. 4a showing a circuit diagram and FIG. 4b showing the construction thereof.
Figure 4B:
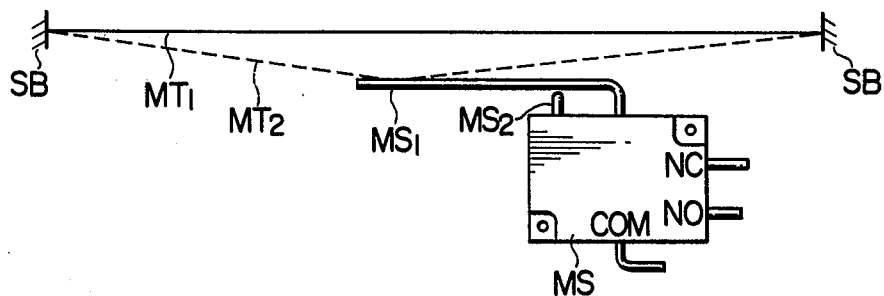
FIG. 4 show still another embodiment of the operation detector.

The present invention is not limited to the specific embodiment explained above with reference to the golf club swing action, but may be used with equal effect for recording any variations of motion. Also, the microphone used in the above-described embodiment as the trigger signal detector for detecting the impact sound may be replaced by a light detector as shown in FIG. 3 in which a magnetic tape MT or the like magnetic recording medium is made to run between the opposedly placed a lamp $L_9$ and a photo-transistor $Q_9$ so that the light emitted from the Lamp $L_9$ is detected by the phototransistor $Q_9$. In another modification shown in FIG. 4, the lever $MS_1$ of the microswitch MS is placed opposite to the tape $MT_1$ with its ends fixed by means of a fixed member SB, so that when the tape $MT_1$ is pressed and relocated into the position $MT_2$ is brought into contact with the pin $MS_2$, with the result that the common terminal COM is switched from NC to NO side, thus producing a certain voltage of H level at the output terminal $T_1$.

Even though the above-described embodiment has 15 channels, it may alternatively be of any number. Also, the number of tracks covered from the detection of a trigger signal until the termination of recording may be in any number other than 7 as in the embodiments referred to above. By selecting an appropriate number of the flip-flops, for example, a specific maximum number of countable pulses can be determined as desired. Such flip-flops may be done away with, in which case the recording is stopped immediately after the detection of the trigger signal thereby to keep the record from being erased until the detection of the trigger signal. Still another modification may be constructed to stop the recording operation on the tracks only after a predetermined period of time following the detection of the trigger signal.

It will be thus seen that the objects set forth above, among those made apparent from the preceding description, are efficiently attained, and since certain changes may be made in the above construction without departing from the spirit and scope of the invention, it is intended that all matter contained in the above description or shown in the accompanying drawings shall be interpreted as illustrative and not in a limiting sense.

I claim:

1. An automatic record control apparatus for a multichannel memory comprising:
a magnetic recording medium having multichannel tracks;
first means for recording video signals in said multichannel tracks one-track by one-track endlessly in such a manner that the track to be recorded is changed from one track to the next and returned to the first track from the last track for sequentially recording said video signals in a track-by-track fashion in response to pulses associated with vertical synchronizing pulses for said video signals, the period of said pulses associated with the vertical synchronizing pulses being selected so as to record all of the desired video signals of said video signals in said multichannel tracks;
a trigger signal detector;
an amplifier for amplifying said trigger signal detected by said trigger signal detector into a predetermined level; a gating device for passing said pulses associated with said vertical synchronizing signal from the instant of detecting said trigger signal;
a counter circuit for counting a predetermined even number of said pulses associated with said vertical synchronizing pulses, said counter circuit producing a first potential indicative of half of said even number when said half of said even number is reached, said counter circuit producing a second potential indicative of said predetermined even number when said predetermined even number is reached, said second potential being different from said first potential; and a control circuit including a resistor and a capacitor, said capacitor being charged with said first potential when said first potential is produced, said capacitor being discharged through said resistor when said second potential is produced, the recording in said multichannel being stopped at time of said discharge.

2. An automatic record control apparatus for a multichannel memory comprising: p1 a magnetic recording medium having multichannel tracks;
first means for recording video signals in said multichannel tracks one-track by one-track endlessly in such a manner that the track to be recorded is changed from one track to the next and returned to the first from the last track from sequentially recording said video signals in a track-by-track fashion in response to pulses associated with vertical synchronizing pulses for said video signals, the period of said pulses associated with the vertical synchronizing pulses being selected so as to record all of the desired video signals of said video signals in said multichannel tracks, said first means including a recording switch and a hold circuit consisting of a bistable multivibrator being switched from one stable state to the other stable state for holding a recording state when said recording switch is changed over to the normally open side;
a trigger signal detector;
an amplifier for amplifying said trigger signal detected by said trigger signal detector into a predetermined level; a gate device for passing said pulses associated with said vertical synchronizing signal from the instant of detection of said trigger signal by said amplifier, a counter circuit for counting a predetermined even number of said pulses associated with said vertical synchronizing pulses, said counter circuit producing a first potential indicative of half of said even number when said half of said even number is reached, said counter circuit producing a second potential indicative of said predetermined even number when said predetermined even number is reached, said second potential being different from said first potential; and a control circuit including a resistor and a capacitor, said capacitor being charged with said first potential when said first potential is produced, said capacitor being discharged through said resistor when said second potential is produced, said bistable multivibrator being switched back from one stable state to the other stable state by said discharge of said capacitor thereby to stop the recording in said multichannel tracks.

3. An automatic record control apparatus for a multichannel memory comprising:
a magnetic recording medium having multichannel tracks;
first means for recording video signals in said multichannel tracks one-track by one-track endlessly in such a manner that the track to be recorded is changed from one track to the next and returned to the first track from the last track for sequentially recording said video signals in a track-by-track fashion in response to pulses associated with vertical synchronizing pulses for said video signals, the period of said pulses associated with the vertical synchronizing pulses being selected so as to record all of the desired video signals of said video signals in said multichannel tracks;
a trigger signal detector; and
second means for stopping the recording operation of said first means in said multichannel tracks in response to a trigger signal detected by said trigger detector, said recording operation being stopped immediately after the completion of the recording of said desired video signals operated by said first means: thereby said desired video signals being recorded in said multichannel tracks without being erased;
said second means comprising an amplifier for amplifying said trigger signal detected by said trigger signal detector into a predetermined level, a gating device for passing said pulse associated with said vertical synchronizing signal from the instant of detecting said trigger signal, a counter circuit for counting a predetermined number of pulses associated with said vertical synchronizing signals which are applied from said gating device, and a control circuit for casusing said first means to stop the recording in said multichannel tracks when said predetermined number is reached by the counts of said counter circuit;
said counter circuit counting a predetermined even number of said pulses associated with said vertical synchronizing pulses, said counter circuit producing a first potential indicative of half of said even number when said half of said even number is reached, said counter ciruciť producing a second potential indicative of said predetermined even number when said predetermined even number is reached, said second potential being different from said potential; said control circuit including a resistor and a capacitor, said capacitor being charged with said first potential when said first potential is produced, said capacitor being discharged through said resistor when said second potential is produced, the recording in said multichannel being stopped at the time of said discharge.

4. An automatic record control apparatus for a multichannel memory comprising:
a magnetic recording medium having multichannel tracks;
first means for recording video signals in said multichannel tracks one-track by one-track endless in such a manner that the track to be recorded is changed from one track to the next and returned to the first track from the last track for sequentially recording said video signals in a track-by-track fashion in response to pulses associated with vertical synchronizing pulses for said video signals, the period of said pulses associated with the vertical synchronizing pulses being selected so as to record all of the desired video signals of said video signals in said multichannel tracks;
a trigger signal detector; and
second means for stopping the recording operation of said first means in said multichannel tracks in response to a trigger signal detected by said trigger signal detector, said recording operation being stopped immediately after the completion of the recording of said desired video signals operated by said first means: thereby said desired video signals being recorded in said multichannel tracks without being erased;
said first means including a recording switch and a hold circuit consisting of a bistable multivibrator, the multivibrator being switched from one stable state to the other stable state for holding a recording state when said recording switch is changed over to the normally open side; said second means comprising and amplifier for amplifying said trigger signal detector by said trigger signal detector into a predetermined level; a gate device for passing said pulses associated with said vertical synchronizing signal from the instant of detection of said trigger signal by said amplifier; a counter circuit for counting a predetermined even number of said pulses associated with said vertical synchronizing pulses, said counter circuit producing a first potential indicative of half of said even number when said half of said even number is reached, said counter circuit producing a second potential indicative of said predetermined even number when said predetermined even number is reached, said second potential being different from said first potential; and a control circuit including a resistor and a capacitor, said capacitor being charged with said first potential when said first potential is produced, capacitor being discharged through said resistor when said second potential is produced, said bistable multivibrator being switched back from one stable state to the other stable state by said discharge of said capacitor thereby to stop the recording in said multichannel tracks. pg,27

5. An automatic record control apparatus comprising:
a magnetic recording medium having multichannel tracks;
a record switch having two positions, namely a normally closed side and a normally open side;
a bistable multivibrator being switched from one stable state to the other stable state upon the changing-over of said record switch from said normally closed side to said normally open side;
second means for recording video signals in said multichannel tracks one-track by one-track endlessly in such a manner that the track to be recorded is changed from one track to the next track and returned to the first track from the last track for sequentially recording said video signals in a track-by-track fashion in response to pulses associated with the vertical synchronizing pulses for said video signals, the period of said pulses associated with said vertical synchronizing pulses being selected so as to record all of the desired portions of said video signals in said multichannel tracks, and said second means being allowed to record said video signals upon the switching of said multivibrator to said normally open side from said normally closed side;
a trigger signal detector for detectng a trigger signal;
an amplifying means for amplifying the detected trigger signal to a predetermined level;
a gate means including at least one NAND gate and adapted to be immediately opened in response to the amplified trigger signal to thereby enable said pulses associated with said vertical synchronizing pulses to pass therethrough;
a counter circuit including a plurality of JK flipflops for counting a predetermined number of the delivered pulses, said counter circuit producing a first potential when the counter number reaches the specified number which is less than half of the number of said multichannel tracks and said counter circuit producing a second potential when said counted number reaches twice the said specified number;
a control circuit comprising a resistor and a capacitor, said capacitor being charged to said first potential upon the production of said first voltage by said counter circuit and discharging the charge produced by said first potential through said resistor upon the production of said second potential by said counter circuit, and said bistable multivibrator being switched back to one said stable state from the other said stable state upon the discharge of said capacitor to thereby cause said second means stop the recording in said multichannel tracks.

6. An automatic record control apparatus according to claim 5, in which said multichannel tracks comprise 15 tracks, said pulses associated with said vertical synchronizing pulses having a period of 1/15 second, said desired video signals being those signals recorded during one's action of swinging a golf club, and the number of said plurality of JK flip-flops being three.

7. An automatic record control apparatus according to claim 5, in which said gate means includes a first NAND gate connected to said amplifying means and adapted to be opened upon the switching of said bistable multivibrator to said other stable state from said one stable state to thereby enable said amplified trigger signal to pass therethrough, an RS flip-flop connected to said first NAND gate and adapted to hold said amplified trigger signal delivered from said first NAND gate upon the switching of said bisable multivibrator to said other stable state, and a second NAND gate connected to said RS flip-flop and adapted to be opened in response to the output of said RS flip-flop to thereby enable said pulses associated with said vertical synchronizing pulses to pass therethrough, thereby said RS flip-flop being switched to thereby close said second NAND gate and simultaneously said first NAND gate being closed upon the switching of said bistable multivibrator to said one stable state from said other stable state; and in which said counter circuit further includes a third NAND gate connected to said RS flip-flop and adapted to clear said plurality of JK flip-flops upon the switching of said RS flip-flop.

* * * * *